(12) United States Patent
Vaidyanathan et al.

(10) Patent No.: US 8,176,342 B2
(45) Date of Patent: May 8, 2012

(54) REAL-TIME INFERENCE OF POWER EFFICIENCY METRICS FOR A COMPUTER SYSTEM

(75) Inventors: Kalyanaraman Vaidyanathan, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1047 days.

(21) Appl. No.: 12/108,854

(22) Filed: Apr. 24, 2008

(65) Prior Publication Data
US 2009/0271643 A1 Oct. 29, 2009

(51) Int. Cl.
*G06F 1/26* (2006.01)
(52) U.S. Cl. .......... 713/300; 713/320; 713/340
(58) Field of Classification Search .......... 713/300, 713/320, 340
See application file for complete search history.

(56) References Cited

U.S. PATENT DOCUMENTS

| 7,197,411 | B1* | 3/2007 | Gross et al. ............ 702/60 |
| 7,243,243 | B2* | 7/2007 | Gedeon ............ 713/300 |
| 2004/0078723 | A1* | 4/2004 | Gross et al. ............ 714/47 |
| 2005/0049729 | A1* | 3/2005 | Culbert et al. ............ 700/50 |
| 2007/0040582 | A1* | 2/2007 | Gross et al. ............ 326/88 |
| 2009/0235062 | A1* | 9/2009 | Vaidyanathan et al. ............ 713/1 |
| 2009/0271046 | A1* | 10/2009 | Lewis et al. ............ 700/291 |

* cited by examiner

*Primary Examiner* — Chun Cao
(74) *Attorney, Agent, or Firm* — Park, Vaughan, Fleming & Dowler LLP; Chia-Hsin Suen

(57) ABSTRACT

Some embodiments of the present invention provide a system that measures a power efficiency of a computer system. During operation, the system collects telemetry data from a set of sensors within the computer system. Next, the system determines a power consumption of the computer system from the telemetry data and determines a number of input/output operations per second (IOPS) for the computer system from the telemetry data. Finally, the system computes an IOPS per watt metric from the power consumption and the number of IOPS.

20 Claims, 2 Drawing Sheets

REAL-TIME INFERENCE OF POWER EFFICIENCY METRICS FOR A COMPUTER SYSTEM

BACKGROUND

1. Field of the Invention

The present invention relates to techniques for determining power consumption in a computer system. More specifically, the present invention relates to a method and system for measuring the power efficiency of a computer system.

2. Related Art

In today's computer servers and storage systems, input/output operations per second (IOPS) per watt is a very important power efficiency metric that customers and vendors use to analyze the relative power efficiencies of different systems. However, methods to efficiently compute and monitor this metric in real time are currently unavailable.

In existing systems, IOPS per watt is measured by attaching hardware power monitors to individual computer systems. Data obtained by the power monitors must then be aggregated and processed to determine the computer systems' IOPS per watt. Such measurement techniques are cumbersome, tedious and expensive to implement in a data center containing a large number and variety of servers and/or storage systems. Consequently, power efficiencies of computer systems are difficult to assess using existing techniques.

SUMMARY

Some embodiments of the present invention provide a system that measures a power efficiency of a computer system. During operation, the system collects telemetry data from a set of sensors within the computer system. Next, the system determines a power consumption of the computer system from the telemetry data and determines a number of input/output operations per second (IOPS) for the computer system from the telemetry data. Finally, the system computes an IOPS per watt metric from the power consumption and the number of IOPS.

In some embodiments, to determine the power consumption of the computer system, the system periodically polls current sensors and associated voltage sensors within the set of sensors to generate dynamic traces of currents and associated voltages for individual components within the computer system. The system then multiplies currents and associated voltages for the individual components within the computer system to produce dynamic traces of power consumption for the individual components. Next, the system aggregates the dynamic traces of power consumption for the individual components to produce a dynamic trace of total power consumption for the computer system In some embodiments, the current sensors and the associated voltage sensors are polled through a telemetry harness which measures sensor variables throughout the computer system.

In some embodiments, a throughput script associated with the telemetry harness is used to determine the number of IOPS for the computer system.

In some embodiments, determining the power consumption of the computer system involves applying an inferential model to the telemetry data to generate an inferential estimate of the power consumption from the telemetry data.

In some embodiments, the inferential model is developed using a non-linear, non-parametric regression technique.

In some embodiments, to determine the number of IOPS for the computer system, the system measures a set of IOPS from a set of storage devices within the computer system and sums the IOPS measured from the storage devices.

DETAILED DESCRIPTION

Figure 1:
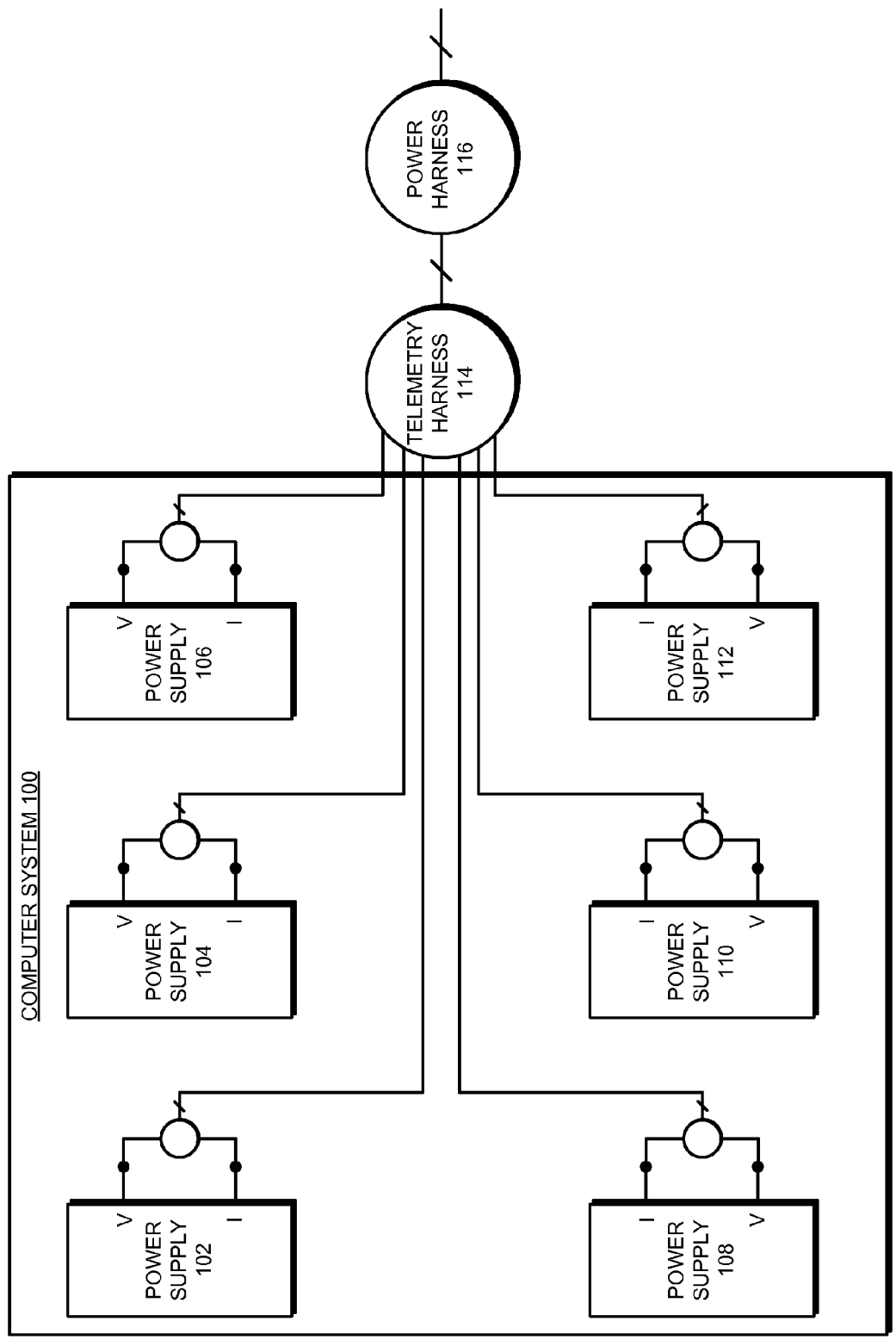
FIG. 1 presents a block diagram of a computer system with a power harness in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The present invention continuously monitors a variety of instrumentation signals in real-time during operation of a computer system. These instrumentation signals may be collected as telemetry data from a set of sensors within the computer system. (Note that although we refer to a single computer system in this disclosure, the present invention also applies to a collection of computer systems).

These instrumentation signals can include signals associated with "internal performance parameters" maintained by software within the computer system. For example, these internal performance parameters can include system throughput, transaction latencies, queue lengths, load on the central processing unit, load on the memory, load on the cache, input/output (I/O) traffic, bus saturation metrics, queue overflow statistics, and various operational profiles gathered through "virtual sensors" located within the operating system.

These instrumentation signals can also include signals associated with "canary performance parameters" for synthetic user transactions, which are periodically generated for the purpose of measuring quality of service from the end user's perspective.

These instrumentation signals can additionally include "physical parameters," such as distributed internal temperatures, environmental variables, currents, and voltages.

FIG. 1 presents a block diagram of computer system 100 with power harness 116 in accordance with an embodiment of the present invention. Computer system 100 also contains sub-components 102, 104, 106, 108, 110, and 112, and telemetry harness 114. In one or more embodiments of the present invention, the sub-components include power supplies within computer system 100, field-replaceable units within computer system 100, and/or storage devices (e.g., hard disk drives) within computer system 100.

Telemetry harness 114 connects to the sensor outputs in sub-components 102, 104, 106, 108, 110, and 112. Through these connections, telemetry harness 114 polls and aggregates the sensor variables for these sub-components as telemetry data. In one embodiment of the present invention, telemetry harness 114 measures a voltage and an associated current from sensors in each sub-component within the computer system. Note that the sub-components can report other variables, such as temperature. Also note that the telemetry harness measures sensor variables simultaneously from each sub-component within the computer system.

Telemetry harness 114 may also measure input/output (I/O) operations from storage devices among sub-components 102, 104, 106, 108, 110, and 112. For example, telemetry harness 114 may measure I/O reads and writes from the storage devices. Telemetry harness 114 may additionally monitor the number of bytes transferred during each I/O operation. In one or more embodiments of the invention, a throughput script associated with telemetry harness 114 is used to measure the I/O operations from each storage device of computer system 110.

In one embodiment of the present invention, power harness 116 is a software-based tool that reads time-domain traces of the sensor variables from telemetry harness 114 and determines the power consumption of computer system 100 based on the time-domain traces of the sensor variables. In a variation on this embodiment, the software-based tool is integrated into computer system 100 as a software patch.

To determine the power consumption of computer system 100, power harness 116 may obtain dynamic traces of currents and associated voltages for sub-components 102, 104, 106, 108, 110, and 112 from the telemetry data collected by telemetry harness 114. Power harness 116 may then multiply currents and associated voltages for the sub-components within computer system 100 to produce dynamic traces of power consumption for the individual components. Finally, power harness 116 may aggregate the dynamic traces of power consumption for the sub-components to produce a dynamic trace of total power consumption for computer system 100.

Alternatively, power harness 116 may determine the power consumption of computer system 100 by applying an inferential model to the telemetry data to generate an inferential estimate of the power consumption from the telemetry data. The inferential model may be developed using a non-linear, non-parametric regression technique, such as a multivariate state estimation technique (MSET), to analyze training data collected by telemetry harness 114. Those skilled in the art will appreciate that other pattern recognition techniques, such as neural networks, Bayesian networks, and/or Markov models may also be used to build the inferential model. The inferential model may then use previously determined correlations between instrumentation signals in the training data to generate an inferential estimate of the power consumption from the telemetry data.

Power harness 116 may additionally determine the power efficiency of computer system 100. To do so, power harness 116 may determine a number of input/output operations per second (IOPS) for computer system 100 from the telemetry data. As discussed above, the IOPS may be measured using a throughput script associated with telemetry harness 114. In particular, the throughput script may monitor reads, writes, and errors from storage devices within computer system 100 by gathering information from sensors and/or monitoring tools within the storage devices. In addition, the throughput script may measure the number of read and write operations occurring in the storage devices, as well as the number of bytes transferred during each read or write operation. The IOPS for a storage device may then be computed by dividing the number of read and write operations from the storage device in a given time period and by the number of seconds elapsed during the time period. Power harness 116 may determine the number of IOPS for computer system 100 by summing the IOPS measured from individual storage devices within computer system 100.

Power harness 116 may then compute an IOPS per watt metric from the power consumption and the number of IOPS computed from the telemetry data. To compute the IOPS per watt metric, power harness 116 may divide the IOPS for computer system 100 by the power consumption of computer system 100. For example, if power harness 116 calculates 1000 IOPS from measurements of I/O operations in computer system 100 and a power consumption of 10 watts from dynamic traces of currents and associated voltages, power harness 116 calculates a value of 100 IOPS per watt for computer system 100. The IOPS per watt metric may thus serve as an indicator of the power efficiency of computer system 100. Alternatively, power harness 116 may divide the IOPS by the power consumption of the storage devices within computer system 100. As a result, the IOPS per watt metric may be based solely on the power efficiency of the storage devices rather than the power efficiency of other sub-components such as processors and memory.

Presently, computer systems use the sensors within computer system components in interrupt mode. While operating in interrupt mode, the computer system only receives a value of a sensor variable if the value exceeds a high-threshold value or a low-threshold value, and thereby causes an interrupt to occur.

Presently, computer systems use these sensors to protect the sub-components within the computer system from being damaged. For example, if the temperature in a sub-component exceeds a high-temperature threshold value, the computer system shuts off the sub-component before the sub-component is damaged or does damage to the rest of the computer system.

In contrast, the present invention periodically polls sensors to create a dynamic trace of the sensor variables. In doing so, the system creates a time-domain trace of the sensor variables for each sub-component and uses the time-domain trace to calculate the power efficiency of the computer system.

Figure 2:
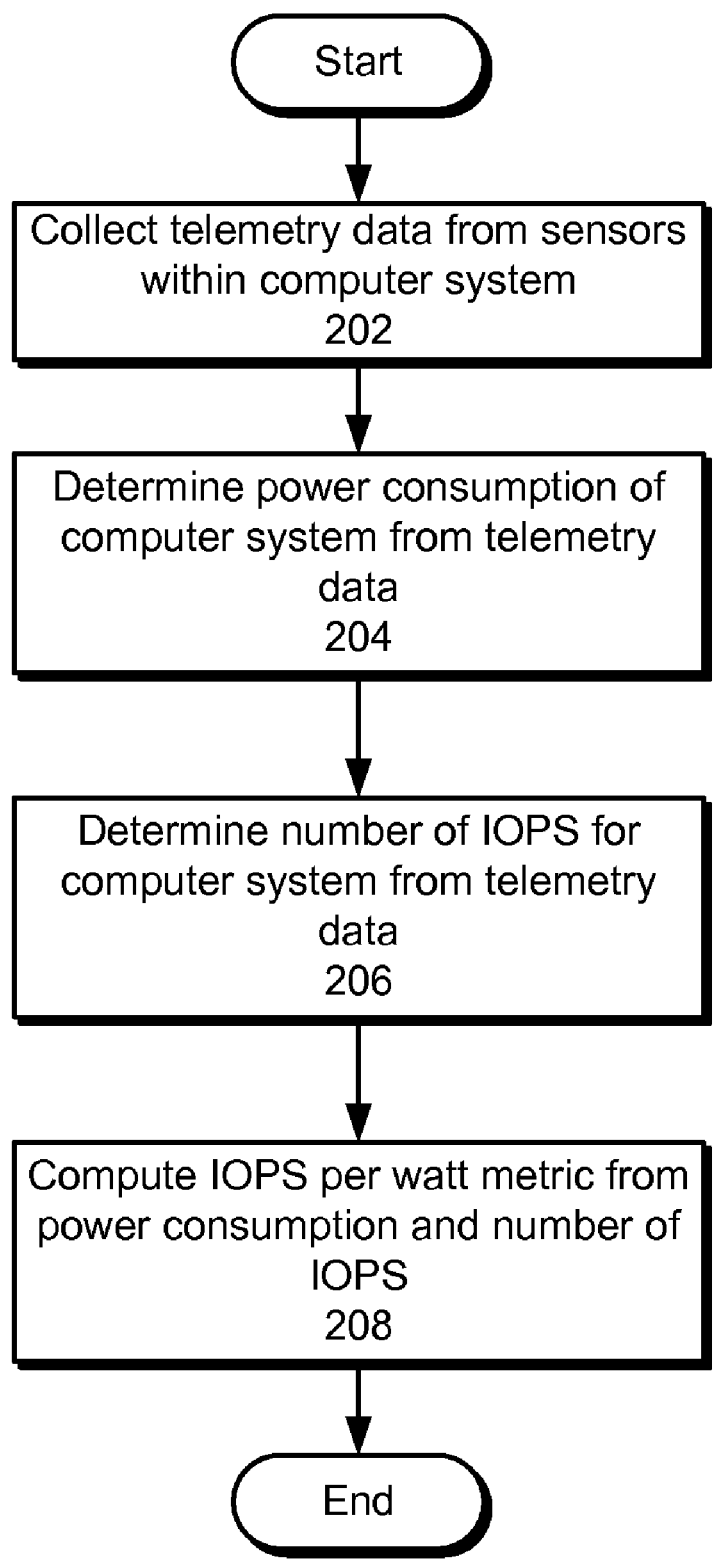
FIG. 2 presents a flow chart illustrating the process of measuring a power efficiency of a computer system in accordance with an embodiment of the present invention.

FIG. 2 presents a flow chart illustrating the process of measuring a power efficiency of a computer system in accordance with an embodiment of the present invention. In one or more embodiments of the invention, one or more of the steps may be omitted, repeated, and/or performed in a different order. Accordingly, the specific arrangement of steps shown in FIG. 2 should not be construed as limiting the scope of the invention.

Initially, telemetry data is collected from a set of sensors within the computer system (operation 202). The telemetry data may include measurements associated with throughput, transaction latencies, queue lengths, processor and memory loads, I/O traffic, bus saturation metrics, queue overflow statistics, internal temperatures, environmental variables, currents, voltages, and/or time-domain reflectometry readings. Furthermore, the telemetry data may be collected using a telemetry harness, such as telemetry harness 114 of FIG. 1.

Next, the power consumption of the computer system is determined from the telemetry data (operation 204). As discussed above, the power consumption may be determined directly by obtaining dynamic traces of currents and associated voltages for individual components within the computer system from the telemetry data, multiplying currents and associated voltages for the individual components (e.g., subcomponents 102, 104, 106, 108, 110, and 112 of FIG. 1) within the computer system to produce dynamic traces of power consumption for the individual components, and aggregating the dynamic traces of power consumption for the individual components to produce a dynamic trace of total power consumption for the computer system. On the other hand, the power consumption may be determined inferentially by applying an inferential model to the telemetry data to generate an inferential estimate of the power consumption from the telemetry data.

A number of IOPS for the computer system is also determined from the telemetry data (operation 206). The number of IOPS may be determined by summing the IOPS measured from individual storage devices within the computer system. An IOPS per watt metric may then be computed from the power consumption of the computer system and the number of IOPS for the computer system (operation 208). More specifically, the IOPS per watt metric may be computed by dividing the number of IOPS by the power consumption. Furthermore, the IOPS per watt metric may be determined by dividing by either the total power consumption of the computer system or by the power consumption of storage devices within the computer system. The IOPS per watt metric may then be used as an indicator of the computer system's power efficiency.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for measuring a power efficiency of a computer system, comprising:
    collecting telemetry data from a set of sensors within the computer system;
    determining a power consumption of the computer system from the telemetry data;
    determining a number of input/output operations per second (IOPS) for the computer system from the telemetry data; and
    computing an IOPS per watt metric from the power consumption and the number of IOPS by dividing the number of IOPS by a power consumption for storage devices for the computer system.

2. The method of claim 1, wherein determining the power consumption of the computer system involves:
    periodically polling current sensors and associated voltage sensors within the set of sensors to generate dynamic traces of currents and associated voltages for individual components within the computer system;
    multiplying currents and associated voltages for the individual components within the computer system to produce dynamic traces of power consumption for the individual components; and
    aggregating the dynamic traces of power consumption for the individual components to produce a dynamic trace of total power consumption for the computer system.

3. The method of claim 2, wherein the current sensors and the associated voltage sensors are polled through a telemetry harness which measures sensor variables throughout the computer system.

4. The method of claim 3, wherein a throughput script associated with the telemetry harness is used to determine the number of IOPS for the computer system.

5. The method of claim 1, wherein determining the power consumption of the computer system involves applying an inferential model to the telemetry data to generate an inferential estimate of the power consumption from the telemetry data.

6. The method of claim 5, wherein the inferential model is developed using a non-linear, non-parametric regression technique.

7. The method of claim 1, wherein determining the number of IOPS for the computer system involves:
    measuring a set of IOPS from a set of storage devices within the computer system; and
    summing the IOPS measured from the set of storage devices.

8. A system for measuring a power efficiency of a computer system, comprising:
    a telemetry harness configured to collect telemetry data from a set of sensors within the computer system; and
    a power harness configured to:
        determine a power consumption of the computer system from the telemetry data;
        determine a number of input/output operations per second (IOPS) for the computer system from the telemetry data; and
        compute an IOPS per watt metric from the power consumption and the number of IOPS by dividing the number of IOPS by a power consumption for storage devices for the computer system.

9. The system of claim 8, wherein the power harness is configured to determine the power consumption of the system by:
    obtaining dynamic traces of currents and associated voltages for individual components within the computer system from the telemetry data;
    multiplying currents and associated voltages for the individual components within the computer system to produce dynamic traces of power consumption for the individual components; and
    aggregating the dynamic traces of power consumption for the individual components to produce a dynamic trace of total power consumption for the computer system.

10. The system of claim 8, wherein the power harness is configured to determine the power consumption of the system by:
   applying an inferential model to the telemetry data to generate an inferential estimate of the power consumption from the telemetry data.

11. The system of claim 10, wherein the inferential model is developed using a non-linear, non-parametric regression technique.

12. The system of claim 8,
   wherein the telemetry harness comprises a throughput script configured to measure a set of IOPS from a set of storage devices within the computer system, and
   wherein the power harness is configured to determine the number of IOPS for the computer system by summing the IOPS from the set of storage devices.

13. The system of claim 12, wherein measuring the set of IOPS from the set of storage devices involves:
   monitoring read and write operations from the storage devices; and
   monitoring a number of bytes transferred during the read and write operations.

14. A computer-readable storage medium storing instructions that when executed by a computer cause the computer to perform a method for measuring a power efficiency of a computer system, the method comprising:
   collecting telemetry data from a set of sensors within the computer system;
   determining a power consumption of the computer system from the telemetry data;
   determining a number of input/output operations per second (IOPS) for the computer system from the telemetry data; and
   computing an IOPS per watt metric from the power consumption and the number of IOPS by dividing the number of IOPS by a power consumption for storage devices for the computer system.

15. The computer-readable storage medium of claim 14, wherein determining the power consumption of the computer system involves:
   periodically polling current sensors and associated voltage sensors within the set of sensors to generate dynamic traces of currents and associated voltages for individual components within the computer system;
   multiplying currents and associated voltages for the individual components within the computer system to produce dynamic traces of power consumption for the individual components; and
   aggregating the dynamic traces of power consumption for the individual components to produce a dynamic trace of total power consumption for the computer system.

16. The computer-readable storage medium of claim 15, wherein the current sensors and the associated voltage sensors are polled through a telemetry harness which measures sensor variables throughout the computer system.

17. The computer-readable storage medium of claim 16, wherein a throughput script associated with the telemetry harness is used to determine the number of IOPS for the computer system.

18. The computer-readable storage medium of claim 14, wherein determining the power consumption of the computer system involves applying an inferential model to the telemetry data to generate an inferential estimate of the power consumption from the telemetry data.

19. The computer-readable storage medium of claim 18, wherein the inferential model is developed using a non-linear, non-parametric regression technique.

20. The computer-readable storage medium of claim 14, wherein determining the number of IOPS for the computer system involves:
   measuring a set of IOPS from a set of storage devices within the computer system; and
   summing the IOPS measured from the set of storage devices.

* * * * *